US009148284B2

(12) United States Patent
Vantaggiato

(10) Patent No.: US 9,148,284 B2
(45) Date of Patent: Sep. 29, 2015

(54) IDENTIFICATION AND/OR AUTHENTICATION METHOD

(71) Applicant: Daniele Vantaggiato, Mestre-Venezia (IT)

(72) Inventor: Daniele Vantaggiato, Mestre-Venezia (IT)

(73) Assignee: Bjoern Pirrwitz, Sofia (BG)

( * ) Notice: Subject to any disclaimer, the term of this patent is extended or adjusted under 35 U.S.C. 154(b) by 0 days.

(21) Appl. No.: 14/155,257

(22) Filed: Jan. 14, 2014

(65) Prior Publication Data

US 2015/0200780 A1 Jul. 16, 2015

(51) Int. Cl.
*H04L 9/32* (2006.01)

(52) U.S. Cl.
CPC .................................... *H04L 9/3213* (2013.01)

(58) Field of Classification Search
CPC ..... G07F 7/1008; G07F 21/34; G06Q 20/341; H04L 63/0853; H04L 9/3234; H04L 63/08; H04W 12/06
See application file for complete search history.

(56) References Cited

U.S. PATENT DOCUMENTS

| 7,117,528 | B1 * | 10/2006 | Hyman et al. | 726/5 |
|---|---|---|---|---|
| 2002/0095507 | A1 * | 7/2002 | Jerdonek | 709/229 |
| 2002/0095569 | A1 * | 7/2002 | Jerdonek | 713/155 |
| 2002/0164031 | A1 * | 11/2002 | Piikivi | 380/270 |
| 2006/0282660 | A1 * | 12/2006 | Varghese et al. | 713/155 |
| 2008/0086759 | A1 * | 4/2008 | Colson | 726/2 |
| 2009/0089869 | A1 * | 4/2009 | Varghese | 726/7 |
| 2009/0249076 | A1 * | 10/2009 | Reed et al. | 713/181 |
| 2010/0042847 | A1 * | 2/2010 | Jung et al. | 713/183 |
| 2010/0180328 | A1 * | 7/2010 | Moas et al. | 726/6 |
| 2010/0199089 | A1 | 8/2010 | Vysogorets et al. | |
| 2011/0060913 | A1 * | 3/2011 | Hird et al. | 713/184 |
| 2011/0145570 | A1 * | 6/2011 | Gressel et al. | 713/159 |
| 2012/0005474 | A1 | 1/2012 | Bourret et al. | |
| 2012/0030047 | A1 | 2/2012 | Fuentes et al. | |
| 2012/0144461 | A1 * | 6/2012 | Rathbun | 726/5 |
| 2013/0124855 | A1 | 5/2013 | Varadarajan et al. | |

* cited by examiner

*Primary Examiner* — Yonas Bayou
(74) *Attorney, Agent, or Firm* — QuickPatents; Kevin Prince

(57) ABSTRACT

A computer-implemented authentication method allows a user having a personal electronic device (PED) to login to a recipient system. The user establishes an account on an authentication server, provides personal information to the PED, and uniquely identifies the user's PED. The authentication method establishes a unique token ID for the user. Upon interacting with the recipient system, the user is prompted for his token ID. The recipient system communicates with the authentication server to request the user's information. The authentication server sends an authentication request to the user's PED, which prompts the user for a decision to proceed or not. The user, if deciding to proceed with authentication, selects a subset of the user's personal information that is then sent to the recipient system by the PED, the recipient system authenticating the user thereby.

17 Claims, 7 Drawing Sheets

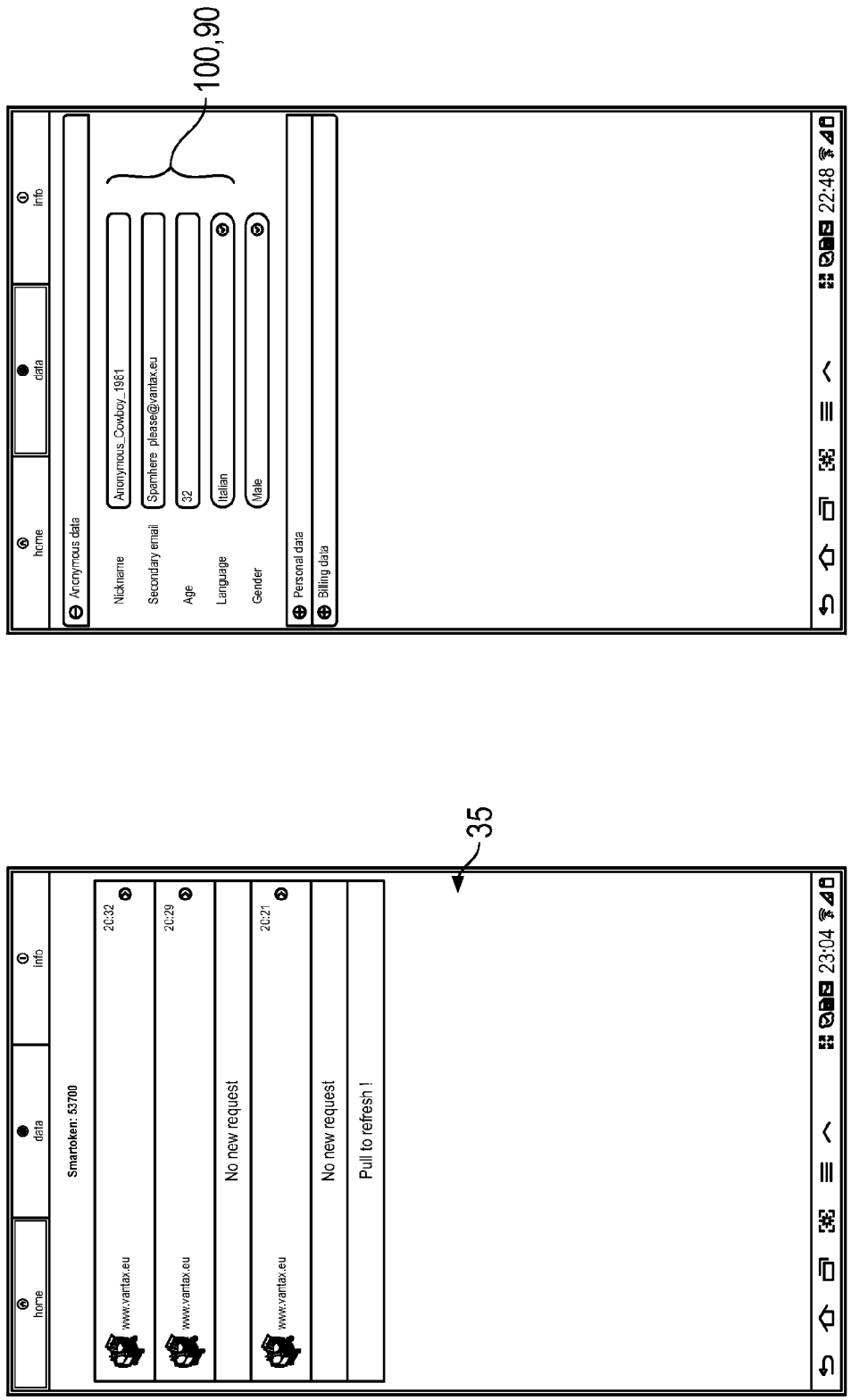

IDENTIFICATION AND/OR AUTHENTICATION METHOD

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to authentication methods, and more particularly to a secure authentication method utilizing a person's personal electronic device.

DISCUSSION OF RELATED ART

Most websites and purchasing kiosks require a user to register and log-in in order to use the websites to conduct transactions, change account information, or the like. Many websites attempt to profile visitors so as to either identify them or their demographic, thereby being able to tailor a displayed message accordingly.

Several methods of identifying users are known, such methods falling generally into either indirect or direct methods. Indirect methods include, for example, writing and reading cookies, tracking Internet Protocol (IP) address, and the like. Such indirect methods are relatively non-invasive but are much less accurate than direct methods.

Direct methods of identifying a user require a specific active recognition of the user that involves two steps: identification and authentication. Identification is a recognition step that essentially answers the question, "Who are you?" The user wanting to access an online system such as an e-commerce site, for example, must be able to either register as a new user or login as an existing user, typically by submitting a unique personal identifier such as an email address, user ID, membership number, or the like. Authentication is a verification step that essentially answers the question, "How can you demonstrate you're really who you say you are?" Typically websites request a password, PIN code, or the like, ostensibly only known by the user and the website. Advanced authentication methods utilize biometric data such as fingerprints, iris characteristics, or the like.

Such systems traditionally rely on the authentication information be kept a secret and being difficult to guess. Many jurisdictions require passwords not to have any direct reference to the user so as to be less likely to be derived from information known about the user. Further, users are frequently told not to use the same password on multiple websites. However, such requirements are difficult to enforce, and hence many people out of laziness will use the same easy-to-guess password on multiple sites, rendering their information less secure on all such sites.

Drawbacks to such typical identification and authorization systems include the following:

1) Such websites, such as e-commerce websites for example, herein referred to as recipient systems, must protect the user's personal information with adequate security measures. Storehouses of such information are often targets of hacking attacks for the purposes of fraudulently obtaining large sets of personal information such as names, addresses, credit card numbers, and the like.

2) User's must generate, carefully store and periodically update passwords for any such recipient systems, preferably always having unique passwords for each site that he wishes to access. This requires either an excellent filing system or an extraordinary memory.

3) The user, in order to initially register at such websites and recipient systems, must transmit enough of his personal information to conduct his desired business at the website. For example, an e-commerce site user who desires to purchase an item and have it delivered to his home address, must communicate all of his generic information, such as name, address, phone number, email address, credit card information, and the like. Such data must be re-entered for every site, which is time consuming and prone to typing errors.

4) In the event that the user's information changes, such as his address or email address, the user must update such information on every website he wishes to conduct future business with. This is time consuming, and often the user will not remember if he's updated the information on a particular website, such as his shipping address for example. This can result in a user's shipment being mistakenly delivered to an old address.

5) Recipient systems that have stored personal information of many users often have the challenge that their information on many of their users is obsolete, making bulk mailings or email campaigns less efficient and effective.

One partial solution to some of these drawbacks is a so-called "single sign-on" method, which is based on a unique user account at a principal system, for example a social network platform such as Facebook, Linked-In, Twitter, or the like. In such a single sign-on system, to log into a recipient system for transacting some sort of business, for example, the user must first log-in to the principal system through the recipient system. Once the user has been identified and authenticated by the principle system, the principle system shares certain data with the recipient system and the recipient system establishes a user session with the user.

Such single sign-on systems have certain disadvantages, such as: 1) the principal system must be informed of the user's personal information, and the user may not desire such a principal system to have such personal information; 2) the principal system learns about all of the recipient systems that the user visits and transacts business with; 3) the recipient system must have a trust relationship with the principal system; 4) the user must trust both the principal system and the recipient system that proper sharing of the user's personal data is taking place; 5) the principal system, typically being a social network platform, learns about the recipient systems that the users' friends or contacts frequent as well, which raises additional privacy and trust issues between all of the principal system's users; and 6) the login ID and passwords of users on the recipient systems become more valuable, and hence a more attractive hacking target, with every recipient system the user accesses through the principal system, requiring increased security and resulting in greater risk if such login credentials are compromised.

Therefore, there is a need for a system that reduces the burden of securing user information at recipient sites, thereby lowering their overhead costs for such recipient systems. Such a needed invention would also reduce the burden on the user of having to remember multiple, unique, and complex passwords, one for each recipient system he wishes to use. Such a needed system would further eliminate the need for the user to enter his personal information at every site, and updating his information across all of the sites he uses would also be streamlined. Further, such a needed invention would result in the personal information of each user being more current for any given recipient system. The present invention accomplishes these objectives.

SUMMARY OF THE INVENTION

The present device is a network structure used by a computer-implemented authentication method for allowing a user having a personal electronic device, such as a mobile phone, laptop, tablet computer, or the like, to register and/or login to a recipient system, such as an e-commerce website, utilizing either another device such as a kiosk, ATM, remote workstation, computer, or even on the same personal electronic device. The method comprising the steps listed below.

First, an authentication server is provided that is able to communicate with the personal electronic device (PED) and the recipient system through a network. Such an authentication server may be connected to the Internet, for example, along with a PED of the user and the recipient system.

Before being able to use the authentication method, the user must establish an account on the authentication server, storing personal information of the user into a memory of the PED, and uniquely identifying the user's personal electronic device, such as through a unique PED ID or some function thereof, for example. The authentication server preferably communicates with the PED through a mobile application running on the PED, such mobile application being downloaded to the PED by the user from the authentication server or elsewhere. The mobile application communicates the personal information of the user and the unique PED ID to the recipient system at the direction of the authentication server, all preferably through an encrypted connection. Preferably the user establishes his account on the authentication server through the mobile application running on the PED, not having to interact with the authentication server directly.

The authentication method establishes a unique token ID for the user which is preferably easy to remember and simple to type. Upon interacting with the recipient system, the user is prompted for his token ID.

The recipient system, upon receiving the user's token ID, communicates with the authentication server to request login or registration information from the PED directly, referencing the user's token ID. The authentication server, upon receiving the information request from the recipient system, sends an authentication request to the user's PED, which prompts the user for a decision to proceed with authentication at the recipient system or not, and if so, to select a subset of the user's personal information that the PED is authorized to submit to the recipient system through the network. The user, if deciding to proceed with authentication, selects the subset of the user's personal information to send to the recipient system and instructs the PED to proceed. The PED retrieves the subset of personal information from its memory and sends same to the recipient system, preferably through an encrypted connection.

The recipient system receives the subset of personal information and either identifies or authenticates the user thereby, establishing a user session. The user is subsequently registered and logged into the recipient system. After the user performs a transaction, after a preset time of inactivity, or after the user overtly logging off of the recipient system, the session ends and the user would have to repeat the above process to log back into the recipient system.

The present invention is a system that reduces the burden of securing user information at recipient sites, thereby lowering the overhead costs for such recipient systems. The present invention reduces the burden on the user of having to remember multiple, unique, and complex passwords, one for each recipient system he wishes to use, and further eliminates the need for the user to enter his personal information at every site. The present system eliminates the need for the user having to remember to update his information if it changes across all of the sites he uses. Further, the present invention results in the personal information of each user being more current for any given recipient system, and retains personal information with the user instead of on a remote data storage location on the network, for example. Other features and advantages of the present invention will become apparent from the following more detailed description, taken in conjunction with the accompanying drawings, which illustrate, by way of example, the principles of the invention.

DESCRIPTION OF THE DRAWINGS

FIG. 8 is a sample interface screen of the mobile application showing a history of authentication requests;

FIG. 9 is a sample interface screen of the mobile application showing an anonymous subset of the user's personal information;

FIG. 10 is a sample interface screen of the mobile application showing a personal subset of the user's personal information;

FIG. 11 is a sample interface screen of the mobile application showing an economic subset of the user's personal information.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
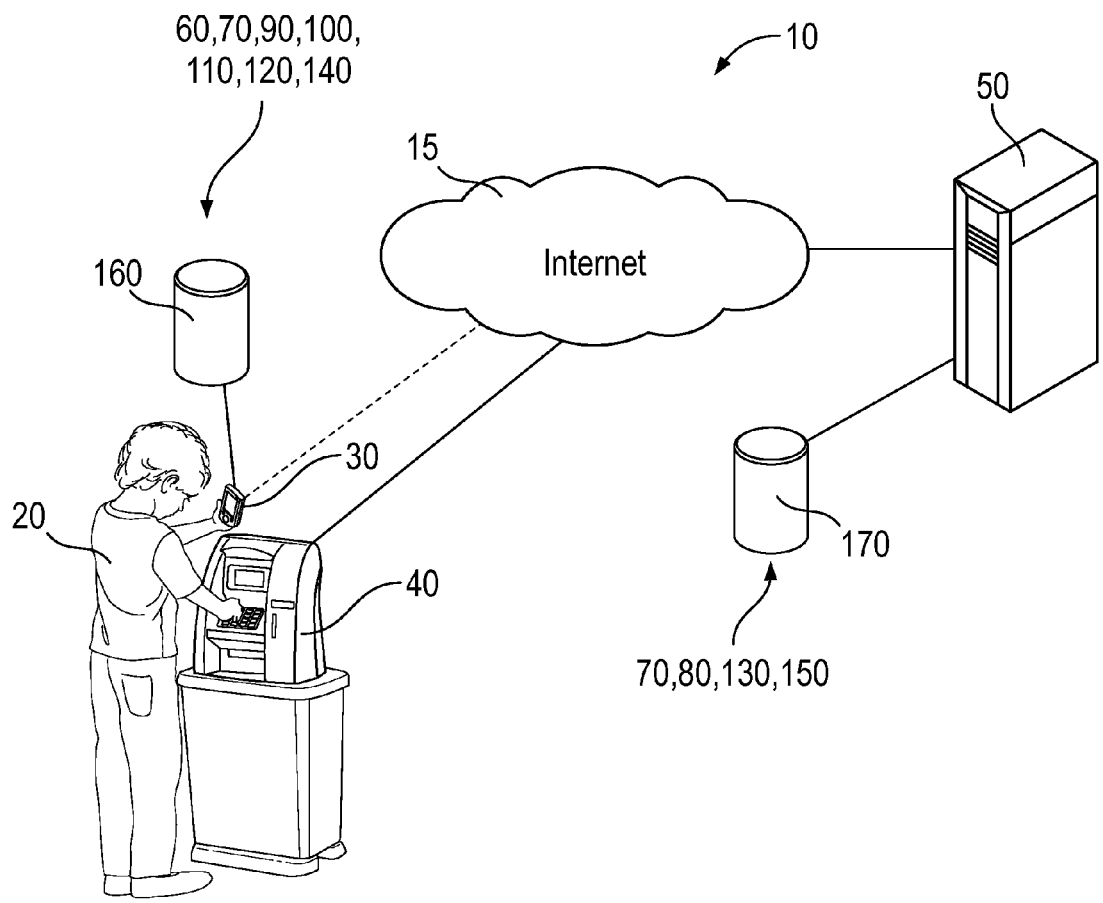
FIG. 1 is a network diagram illustrating a user and his personal electronic device (PED), a recipient system, an authentication server, all mutually networked such as through the Internet.

FIG. 1 illustrates a network structure used by a computer-implemented authentication method 10 for allowing a user 20 having a personal electronic device 30, such as a mobile phone, laptop, tablet computer, or the like, to register and/or login to a recipient system 40, such as an e-commerce website, utilizing either another device such as a kiosk, ATM, remote workstation, computer, or even on the same personal electronic device 30. The method comprising the following steps, explained in detail below.

First, an authentication server 50 is provided that is able to communicate with the personal electronic device 30 (PED 30) and the recipient system 40 through a network 15. Such an authentication server 50 may be connected to the Internet, for example (FIG. 1), along with a PED 30 of the user 20 and the recipient system 40. For example, the user 20 may be attempting to purchase a gift card from an ecommerce kiosk 40.

Figure 12:
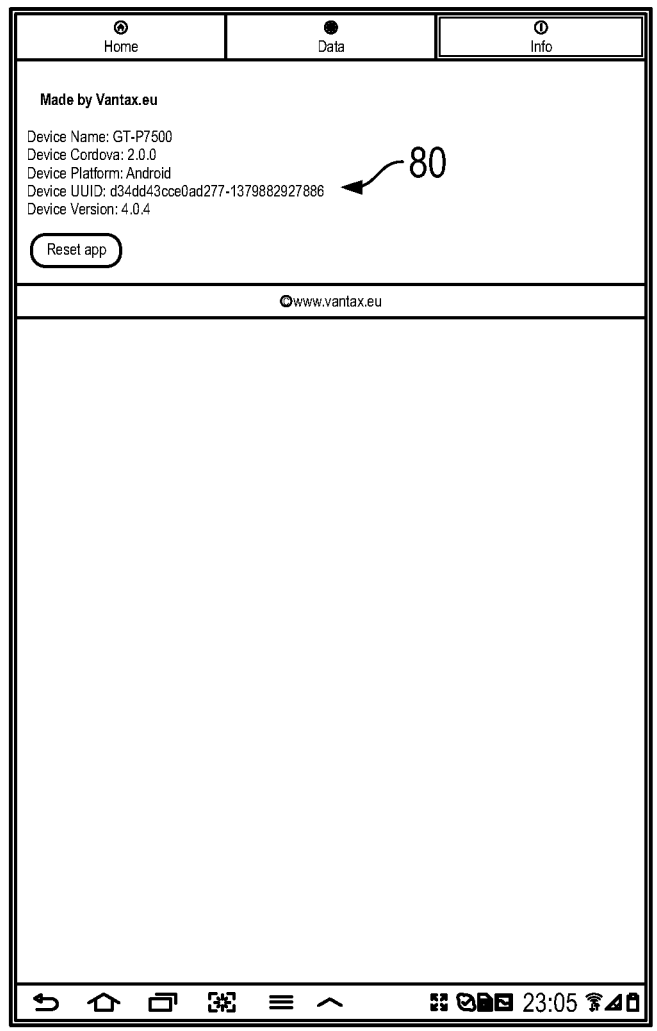
FIG. 12 is a sample interface screen of the mobile application showing a unique PED ID of the user's PED.

Before being able to use the authentication method 10, the user 20 must establish an account on the authentication server 50, and provide personal information 60 of the user 20 stored only on the PED 30 such as on a first non-transitory computer-readable storage medium 160 of the PED 30 or elsewhere, but not on the authentication server 50. The authentication server 50 uniquely identifies the user's personal electronic device 50, such as through a unique PED ID 80 (FIG. 12) or some function thereof, for example. The authentication server 50 communicates with the PED 30 through a mobile application 35, for example, running on the PED 30, such mobile application 35 being downloaded to the PED 30 by the user 20 from the authentication server 50 or elsewhere. The mobile application 35 communicates the unique PED ID 80 to the authentication server 50, preferably through an encrypted connection. Alternately, the PED 30 may communicate with the authentication server 50 through SMS text messages, a chat application, email, or the like. The personal information 60 of the user 20 is stored on or by the PED 30, preferably on the first non-transitory computer-readable storage medium 160, and only accessible thereby. The mobile application 35 preferably interacts with the authentication server 50 to establish the user account, whereby the user 20 does not need to interact with the authentication server 50 directly.

In one embodiment, the personal data 60 is encrypted with an encryption key 130 so that it becomes encrypted personal information 140. The encrypted personal information 140 is then stored on either the PED 30 or the non-transitory computer-readable storage medium 160, with the encryption key 130 being stored by the authentication server 50, preferably on a second non-transitory computer-readable storage medium 170.

The authentication method 10 establishes a unique token ID 70 for the user 20 which is preferably easy to remember and simple to type. The token ID 70 is preferably established by the authentication server 50 and stored on the PED 30 by the mobile application 35. The token ID 70 may be based on the unique PED ID 80, or alternately a combination of the unique PED ID 80 and a random token key 150 generated by the authentication server 50, such that the user 20 may reset the token ID 70 at will if he believes his token ID 70 has been fraudulently used, for example.

Figure 3:
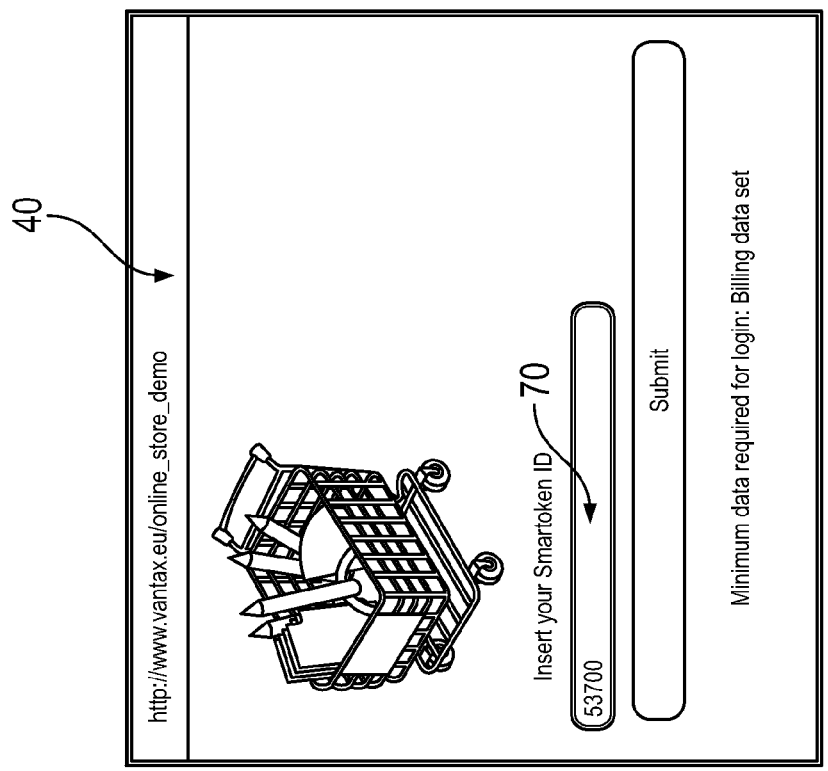
FIG. 3 is a sample interface screen of the recipient system prompting the user for a unique token ID of the user.
Figure 2:
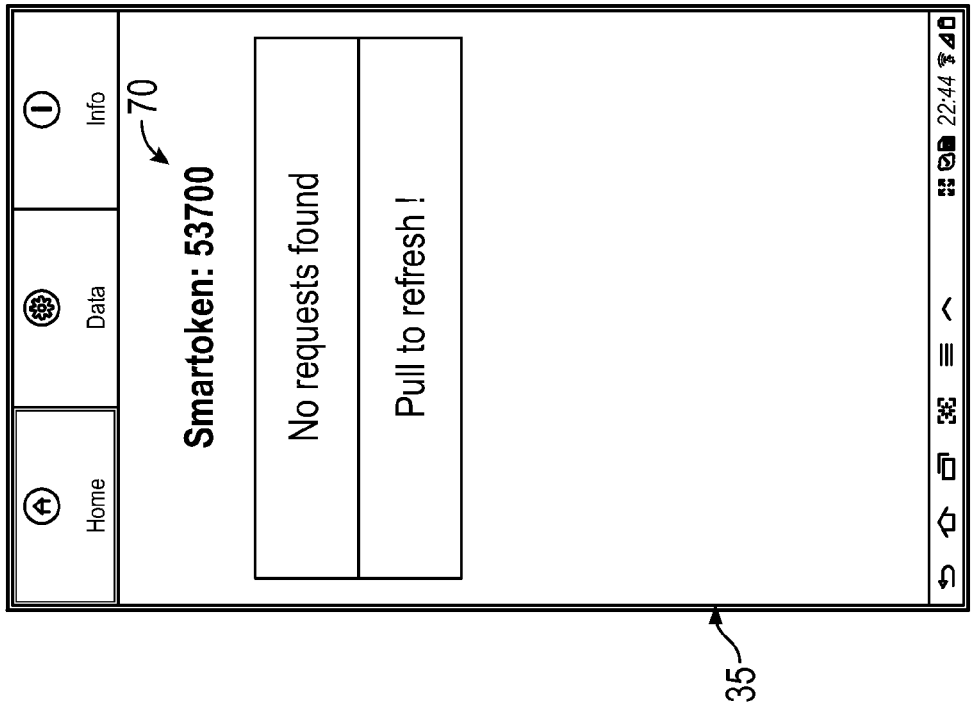
FIG. 2 is a sample interface screen of a mobile application running on the user's PED.

Upon interacting with the recipient system 40, the user 20 is prompted for his token ID 70 (FIG. 3). If the user 20 does not remember his token ID 70, he can activate the mobile application 35 on his PED 30 which displays the token ID 70 (FIG. 2), referred to as a "Smartoken" in the illustrations by way of example. The mobile application 35 may also be password protected or protected with a biometric technique, as is known in the art, to reduce the chance of fraud if the user's PED 30 is lost or stolen, for example.

Figure 6:
FIG. 6 is a sample interface screen of the recipient system showing that the recipient system is waiting for authentication of the user.

The recipient system 40, upon receiving the user's token ID 70, communicates with the authentication server 50 to request login or registration information from the PED 30, referencing the user's token ID 70 (FIG. 6). A software application or module is resident on the recipient system 40 to provide instructions to the processor of the recipient system for performing the method 10.

The authentication server 50, upon receiving the information request from the recipient system 40, sends an authentication request 85 to the user's PED 30, which prompts the user 20 for a decision to proceed with authentication at the recipient system 40 or not, and if so, to select preferably a subset 90 of the user's personal information 60 that the PED 30 is authorized to submit to the recipient system 40. The authentication server 50 sends location or identification information of the recipient system 40 to PED 30, such as the IP address and port, or the like, of the recipient system 40, so that the PED 30 knows how or where to send the subset 90 of the user's personal information 60 to the recipient system 40.

If the user 20 decides not to proceed with authentication, such as if changing his mind about going forward with the transaction or if, for example, a malicious third party has fraudulently used the user's token ID 70 on the recipient system 40, the user declines to send the personal information 60 to the recipient system 40. The recipient system 40 eventually stops waiting for the personal information 60 and cancels the session, returning to a default waiting home screen or the like.

Figure 5:
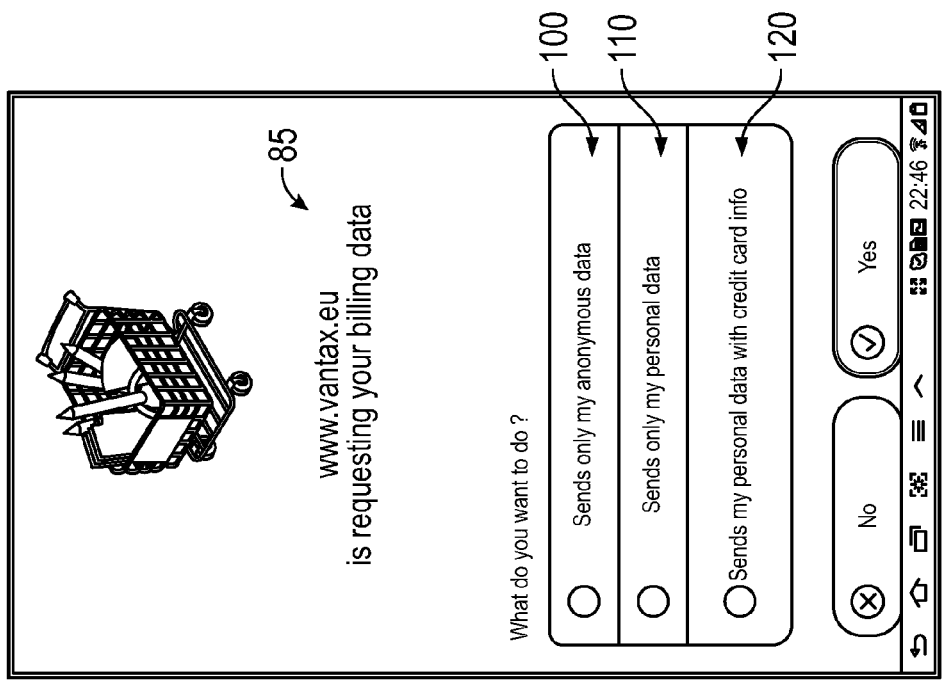
FIG. 5 is a sample interface screen of the mobile application prompting the user to take an action in response to the authentication request of the recipient system.
Figure 4:
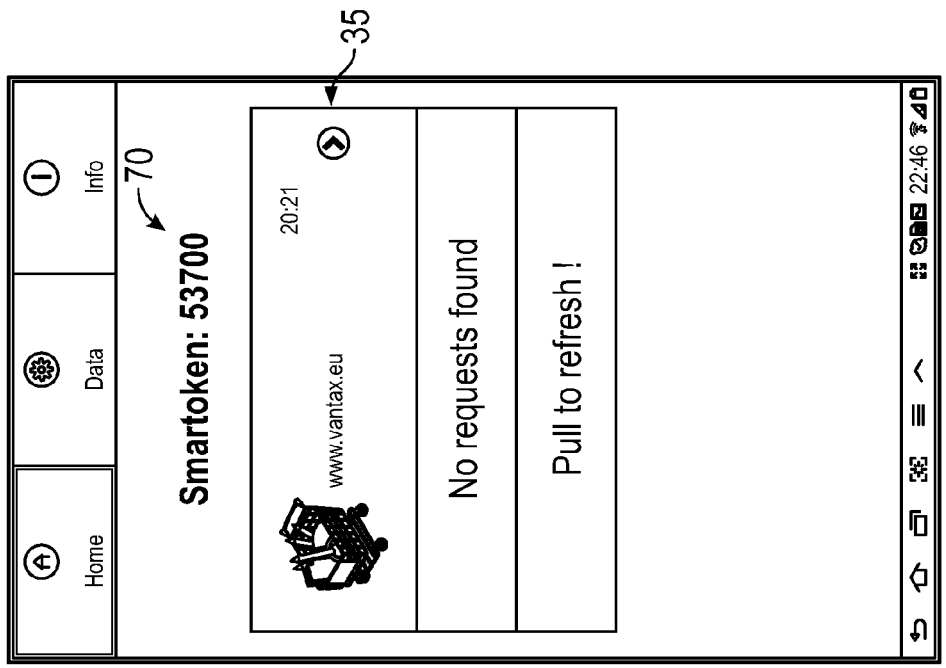
FIG. 4 is a sample interface screen of the mobile application showing any authentication requests received by the PED from the authentication server in response to submitting a token ID in the interface screen of FIG. 3.
Figures 10, 11:
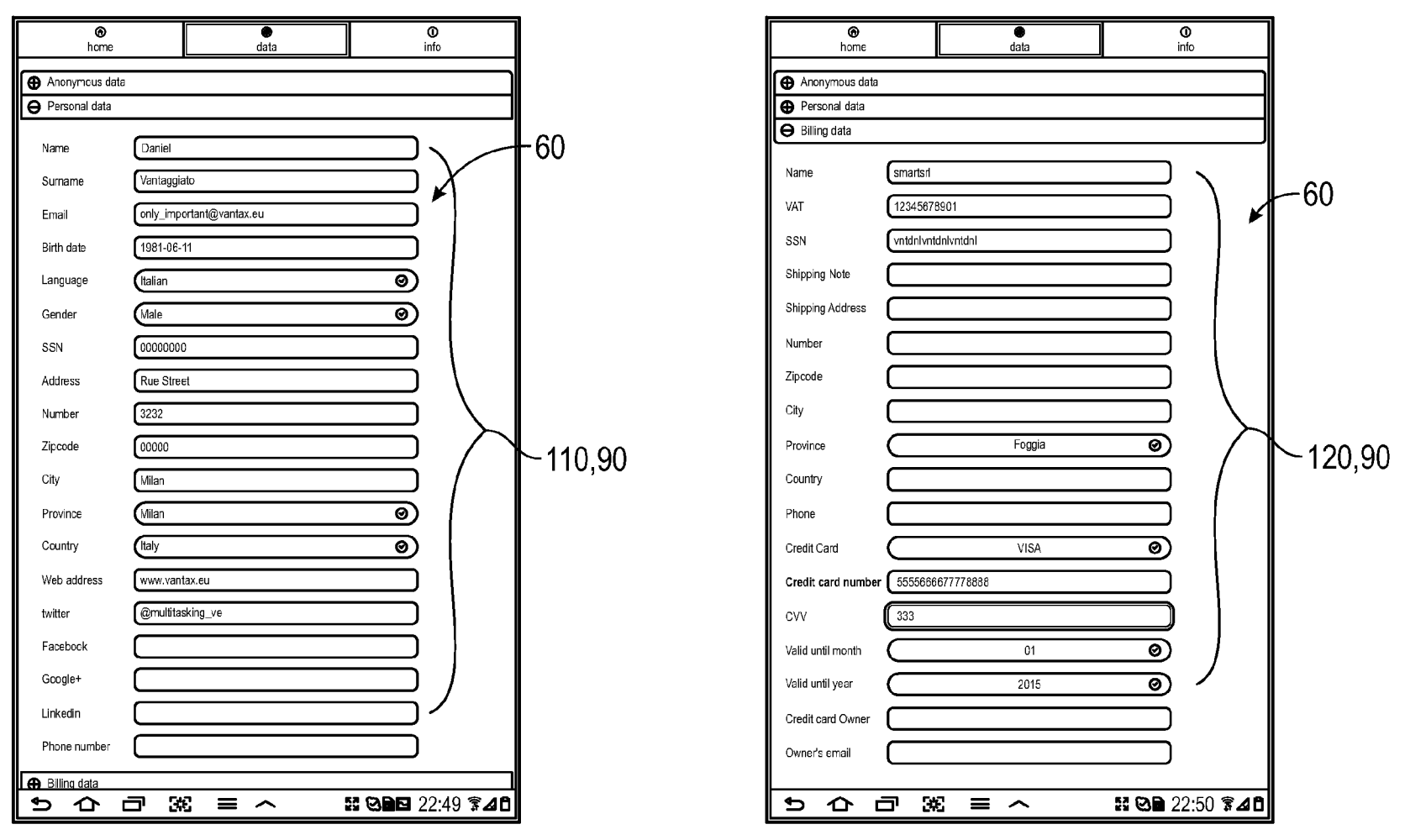

The user 20, if deciding to proceed with authentication, selects the subset 90 of the user's personal information 60 to send to the recipient system 40 and instructs the PED 30 to proceed (FIG. 5). The PED 30 retrieves the subset 90 of personal information 60 from the first non-transitory computer-readable storage medium 160 and sends the subset 90 of personal information 60 to the recipient system 40, preferably through an encrypted connection. In one embodiment, the user's personal information 60 is segregated into several different data sets, such as an anonymous subset 100 (FIG. 9), a personal subset 110 (FIG. 10), and an economic subset 120 (FIG. 11). As such, the user 20 can decide when prompted by the authentication server 50 which subset of the personal data 60 to send to the recipient system 40 (FIGS. 5 and 9-11). The anonymous subset 100 may include non-identifying information of the user 20, for example. The personal subset 110 may include contact identifying personal information 60 of the user 20, such as his name, address, phone numbers, email addresses, social media IDs, or the like. The economic subset 120 may include economic personal information 60 of the user 20, such as name, billing address, credit card information such as credit card number, expiration date, CSV code, and the like, useful for making a financial transaction.

Figure 7:
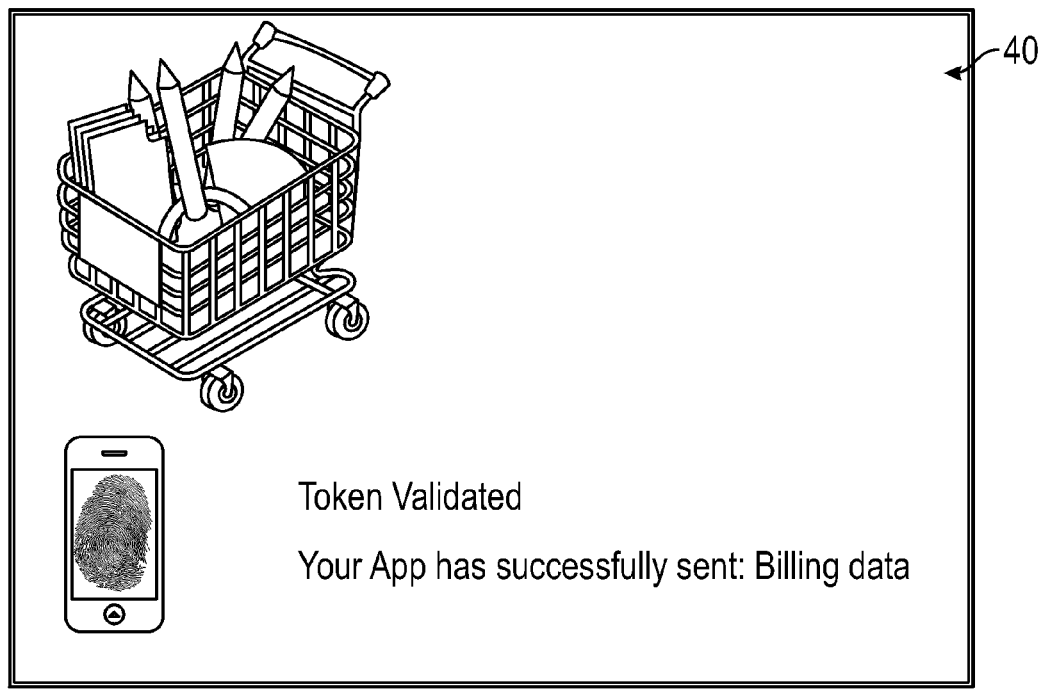
FIG. 7 is a sample interface screen of the recipient system showing that the user has been authorized and logged into the recipient system.

The recipient system 40 receives the subset 90 of personal information 60 and identifies and/or authenticates the user 20 thereby, establishing a user session. The user 20 is subsequently registered and logged into the recipient system 40 (FIG. 7). After the user 20 performs a transaction, after a preset time of inactivity, or after the user 20 overtly logging off of the recipient system 40, the session ends and the user 20 would have to repeat the above process to log back into the recipient system 40.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A computer-implemented authentication method for allowing a user having a personal electronic device to register and/or login to a recipient system, the method comprising the steps:

a) providing an authentication server in communication on a network with the personal electronic device and the recipient system;

b) establishing an account for the user on the authentication server by uniquely identifying the user's personal electronic device in the authentication system and assigning, by the authentication server, a token ID to the user, the token ID being based on the unique identification of the user's personal electronic device;

c) storing personal information of the user on a memory of the personal electronic device, the personal information including at least one of name, address, credit card number, phone number, or email address;

d) the recipient system prompting the user for his unique token ID;

e) the recipient system receiving the user's token ID entered by the user and sending the entered user's token ID to the authentication;

f) the authentication server sending an authentication request to the user's personal electronic device which prompts the user for a decision to proceed with authentication at the recipient system or not;

g) the user if deciding to proceed with authentication authorizing the personal electronic device to send the personal information to the recipient system;

h) the personal electronic device retrieving the personal information and sending the personal information directly to the recipient system; and i) the recipient system receiving the personal information directly from the personal electronic device and identifying the user thereby, the user subsequently being registered and logged into the recipient system.

2. The authentication method of claim 1 wherein the personal information in step c) is differentiated on the personal electronic device between at least an anonymous subset, a personal subset, and an economic subset; and wherein the recipient system in step d) prompts the user for his unique token ID and informs the user of a type of subset of the personal information required to register and/or login; and wherein the personal information in steps f), g) and i) corresponds to either the anonymous subset, the personal subset, or the economic subset of the user's personal information.

3. The authentication method of claim 1 wherein the memory of the personal electronic device in step c) is a first non-transitory computer-readable storage medium accessible by the personal electronic device.

4. The authentication method of claim 3 wherein the personal information of the user in step c) is encrypted and stored on the first non-transitory computer-readable storage medium, the encryption based on an encryption key generated by the authentication server and stored on a second non-transitory computer-readable storage medium; and wherein in step h) the personal electronic device retrieves the encryption key from the authentication server, decrypts the personal information, and sends the decrypted personal information of the user to the recipient system.

5. The authentication method of claim 1 wherein the token ID assigned by the authentication server in step b) is based on a unique identifier of the user's personal electronic device and a random token key established by the authentication server, and further including the step j) the user able to generate a new token ID based on the unique identifier of the user's personal electronic device and the random token key of the authentication server at any time.

6. The authentication method of claim 1 wherein the personal information of the user stored on a memory of the personal electronic device is not provided or stored in the authentication server.

7. The authentication method of claim 1 wherein in step f), the authentication server further sends to the user's personal electronic device identification information of the recipient system together with the authentication request; and the user's personal electronic device in step h) sends the user's personal information to the recipient system pursuant to the received identification information of the recipient system.

8. A non-transitory computer-readable storage medium storing a set of instructions that, when executed by at least one processor, cause the at least one processor to perform operations, comprising:

b) establishing an account for a user on an authentication server that is in communication on a network with a personal electronic device and a recipient system, by uniquely identifying the user's personal electronic device in the authentication system and assigning, by the authentication server, a token ID to the user, the token ID being based on the unique identification of the user's personal electronic device;

c) storing personal information of the user on a memory accessible to the personal electronic device, the personal information including at least one of name, address, credit card number, phone number, or email address;

d) the recipient system prompting the user for his unique token ID;

e) the recipient system receiving the user's token ID entered by the user and sending the entered user's token ID to the authentication server;

f) the authentication server sending an authentication request to the user's personal electronic device which prompts the user for a decision to proceed with authentication at the recipient system or not;

g) the personal electronic device sending the personal information to the recipient system if authorized to do so by the user;

h) the personal electronic device retrieving the personal information and sending the personal information to the recipient system; and i) the recipient system receiving the personal information directly from the personal electronic device and identifying the user thereby, the user subsequently being registered and/or logged into the recipient system.

9. The storage medium of claim 8 wherein the personal information in step c) is differentiated on the personal electronic device between at least an anonymous subset, a personal subset, and an economic subset; and wherein the recipient system in step d) prompts the user for his unique token ID and informs the user of a type of subset of the personal information required to register and/or login; and wherein the personal information in steps f), g) and i) corresponds to either the anonymous subset, the personal subset, or the economic subset of the user's personal information.

10. The storage medium of claim 8 wherein the memory in step c) is a first non-transitory computer-readable storage medium accessible by the personal electronic device.

11. The storage medium of claim 10 wherein the personal information of the user in step c) is encrypted and stored on the first non-transitory computer-readable storage medium, the encryption based on an encryption key generated by the authentication server and stored on a second non-transitory computer-readable storage medium; and wherein in step h) the personal electronic device retrieves the encryption key from the authentication server, decrypts the personal information, and sends the decrypted personal information of the user to the recipient system.

12. The storage medium of claim 8 wherein the token ID assigned by the authentication server in step b) is based on a unique identifier of the user's personal electronic device and a random token key established by the authentication server, and further including the step j) the user able to generate a new token ID based on the unique identifier of the user's personal electronic device and the random token key of the authentication server at any time.

13. An authentication system for allowing a user having a personal electronic device to register and/or login to a recipient system, the system comprising:

an authentication server in communication via a network with both the personal electronic device and the recipient system, the authentication server adapted to establish an account for the user by uniquely identifying the user's personal electronic device and assigning a token ID to the user, the token ID being based on the unique identification of the user's personal electronic device, and adapted to send an authentication request to the user's personal electronic device for a decision of the user to proceed with authentication at the recipient system or not;

a software application resident on the personal electronic device adapted to store personal information of the user on a memory accessible thereto, the personal information including at least one of name, address, credit card number, phone number, or email address, and subsequently retrieving said personal information and sending the personal information to the recipient system when authorized by the user in response to receiving the authentication request;

a software application resident on the recipient system and adapted to prompt the user for the token ID, to receive the user's token ID entered by the user, to send the token ID to the authentication server, and receiving the personal information directly from the personal electronic device to identify the user thereby;

whereby in response to a transaction request by the user, the recipient system prompts the user for his unique token ID and sends the token ID to the authentication server, which sends an authentication request to the user's personal electronic device which prompts the user for a decision to proceed with authentication at the recipient system or not, after which the personal electronic device if authorized by the user retrieves the personal information from the memory and sends the personal information to the recipient system to identify the user thereby, the user subsequently being registered and logged into the recipient system.

14. The authentication system of claim 13 wherein the personal information is differentiated on the personal electronic device between at least an anonymous subset, a personal subset, and an economic subset; and wherein the recipient system is adapted to prompt the user for his unique token ID to inform the user of a type of subset of the personal information required to register and/or login to the recipient system.

15. The authentication system of claim 13 wherein the memory of the personal electronic device is a first non-transitory computer-readable storage medium accessible by the personal electronic device.

16. The authentication system of claim 15 wherein the personal information of the user is encrypted and stored on the first non-transitory computer-readable storage medium, the encryption based on an encryption key generated by the authentication server and stored on a second non-transitory computer-readable storage medium; and wherein the personal electronic device is adapted to retrieve the encryption key from the authentication server, decrypt the personal information, and send the decrypted personal information of the user to the recipient system.

17. The authentication system of claim 13 wherein the token ID assigned by the authentication server is based on a unique identifier of the user's personal electronic device and a random token key established by the authentication server.

* * * * *